(12) United States Patent
Parameshwara et al.

(10) Patent No.: US 11,138,248 B2
(45) Date of Patent: Oct. 5, 2021

(54) UNDERSTANDING USER PRODUCT QUERIES IN REAL TIME WITHOUT USING ANY RULES

(71) Applicant: Dell Products L.P., Round Rock, TX (US)

(72) Inventors: Amith Parameshwara, Bangalore (IN); Ravi Shukla, Bangalore (IN); Karthick D, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 600 days.

(21) Appl. No.: 15/802,666

(22) Filed: Nov. 3, 2017

(65) Prior Publication Data
US 2019/0138616 A1 May 9, 2019

(51) Int. Cl.
*G06F 16/33* (2019.01)
*G06Q 30/06* (2012.01)
*G06F 16/9535* (2019.01)
*G06F 16/9032* (2019.01)
*G06N 3/02* (2006.01)

(52) U.S. Cl.
CPC ...... *G06F 16/3347* (2019.01); *G06F 16/3344* (2019.01); *G06F 16/90332* (2019.01); *G06F 16/9535* (2019.01); *G06Q 30/0623* (2013.01); *G06N 3/02* (2013.01)

(58) Field of Classification Search
CPC ........... G06F 16/3347; G06F 16/90332; G06F 16/3344

USPC ........................................................ 707/728
See application file for complete search history.

(56) References Cited

U.S. PATENT DOCUMENTS

| | | | | |
|---|---|---|---|---|
| 10,372,463 | B1* | 8/2019 | Twomey | G06F 9/4416 |
| 2017/0212957 | A1* | 7/2017 | Voleti | G06F 16/958 |
| 2017/0337612 | A1* | 11/2017 | Galron | G06Q 30/0641 |
| 2017/0372398 | A1* | 12/2017 | Kopru | G06N 3/0454 |
| 2018/0074941 | A1* | 3/2018 | Tokie | G06F 11/302 |
| 2018/0189307 | A1* | 7/2018 | Yu | G06F 16/13 |
| 2018/0365131 | A1* | 12/2018 | Armitage | G06F 11/3664 |
| 2019/0104092 | A1* | 4/2019 | Koohmarey | H04L 51/18 |

OTHER PUBLICATIONS quora.com, What is word2vec?, https://www.quora.com/What-is-word2vec, Sep. 19, 2016.

* cited by examiner

*Primary Examiner* — Allen S Lin
(74) *Attorney, Agent, or Firm* — Terrile, Cannatti & Chambers; Stephen A. Terrile (57) ABSTRACT

A system, method, and computer-readable medium for performing a product query operation, comprising: receiving user input from a user; identifying keywords contained within the user input; comparing keywords to vector representations of words and also to a document vector representation of product specifications in a backend product repository, each vector representation of a word being associated with a particular query type; identifying component details based upon the comparing; and, providing a list of products corresponding to the component details to the user in real time.

14 Claims, 8 Drawing Sheets

| base_raw | cpu_raw | os_raw | ram_raw | storage_raw |
|---|---|---|---|---|
| latitude e5520 | intel core i5-2430m processor 2.40ghz, 3m cache, w | windows 7 professional, no media, 64-bit, english | 4gb | 320gb |
| latitude e6320 | intel core i5-2520m 2.50ghz, 3m cache, upgradable | windows 7 professional, no media, 32-bit, english | 4gb | 320gb |
| latitude e5420 | intel core i5-2430m processor 2.40ghz, 3m cache, w | windows 7 professional, no media, 64-bit, english | 4gb | 320gb |

*Figure 6*

A = {set of product components mentioned in user query}
P = {$P_1, P_2, P_3, ..., P_m$} where $P_m$ is product/sku in the product database (with total m products)
each P containing multiple components = {$C_1, C_2, C_3, ..., C_n$} with total n components for i = 1 to m
begin
  for j = 1 to n
  begin
    component_match_score += count of words that are present in both $A_j$ and $P_j$
    semantic_score += cosine_similarity_word2vec ($A_i, P_j$) (for non-matching words)
  end
  total_score$_i$ = component_match_score + semantic_score
end
sort(total_score, descending)

UNDERSTANDING USER PRODUCT QUERIES IN REAL TIME WITHOUT USING ANY RULES

BACKGROUND OF THE INVENTION

Field of the Invention

The present invention relates to information handling systems. More specifically, embodiments of the invention relate to understanding user product queries.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to access a website via a web browser executing on the information handling system. It is known that the website may be executed on a web server which is remote to the information handling system executing the web browser.

It is known to identify and/or predict visitor intent online such as when a visitor accesses an ecommerce type website. Certain known techniques identify and/or predict the intent and then personalize a visitor experience on website via various personalization methods such as targeted offers, personalized product showcase, personalized website navigation.

SUMMARY OF THE INVENTION

A system, method, and computer-readable medium for performing a product query analysis operation. In certain embodiments, the product query analysis operation is performed via an artificial intelligence based engine. In certain embodiments, the product query analysis operation receives a natural language product query, comprehends product requirements from the query, interprets the requirements of the query, extracts product component details for the interpreted requirement, uses a scoring operation to search a product repository and produces a result which identifies suitable products relating to the product query. In certain embodiments, the identification is via a list of suitable products. In certain embodiments, the list of suitable products is sorted by suitability of a product to the query. In certain embodiments, the product query analysis operation occurs in real time (i.e., with no noticeable lag between receiving the query and producing the result).

More specifically, in certain embodiments, the product query analysis operation identifies clusters of keywords created from chat and other customer interaction data. In certain embodiments, the product analysis operation applies a neural network model to the query or other customer interaction data. In certain embodiments the neural network model generates a vector space representation of words within the query or customer interaction data. In certain embodiments, the neural network model includes a word2vec model. In certain embodiment, the word2vec model includes an artificial neural network model which generates vector space representation of words. Words which are used in the same context are associated with the same cluster and are located close together in the vector space. Accordingly, using such a neural network model clusters words used in similar context using a vector space representation. In certain embodiments, the neural network model includes applying a doc2vec model on columns of a product repository to create document vector representation of product specifications.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include an appreciation that online shopping for technically complex items (e.g., items which include a plurality of components, each of which have a plurality of options some of which work or don't work with other selections) can present challenges to a consumer. For example, should a consumer wish to shop for an information handling system in a brick-and-mortar type shop, the consumer could verbally describe their requirements or desires such as "I am looking for a laptop with latest Intel Processor, big RAM, at least 500 GB of hard disk. I also need Windows 10 operating system. I prefer around 15 inch of display." A sales person in the store can easily comprehend the requirements and propose a list of laptop that matches those requirements. However, online shopping can present challenges to a consumer. Often with an online store such as an ecommerce site, a visitor seeking to purchase a technically complex item, such as a laptop, often doesn't have the flexibility and apparatus to lucidly describe their requirements. Further, product queries specific to needs or usage (e.g., "I am looking for a desktop for professional photo editing") can be handled personally by a salesperson but not within ecommerce site unless each product is individually tagged explicitly for specific needs and/or usages.

Various aspects of the present disclosure include an appreciation that online shopping via a chat agent for technically complex items can present challenges to a consumer. For example, when an online consumer chats with an agent, the consumer may present a request such as "I am looking for a laptop with latest Intel Processor, big RAM, at least 500 GB of hard disk. I also need Windows 10 operating system." The chat agent would then need to decipher this requirement text, convert that to exact product component details, then use other tools to filter for these components and provide a suitable product list.

Various aspects of the present disclosure include an appreciation that shopping for technically complex items can present challenges to a consumer even when speaking with a sales person such as via a telephone. Even experienced sales people can have challenges in providing an appropriate product recommendation based upon product queries from customers. The salespeople need to decipher the requirements, convert the requirements to product component details and provide a suitable product list from other filtering tools.

A system, method, and computer-readable medium are disclosed for performing a product query analysis operation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
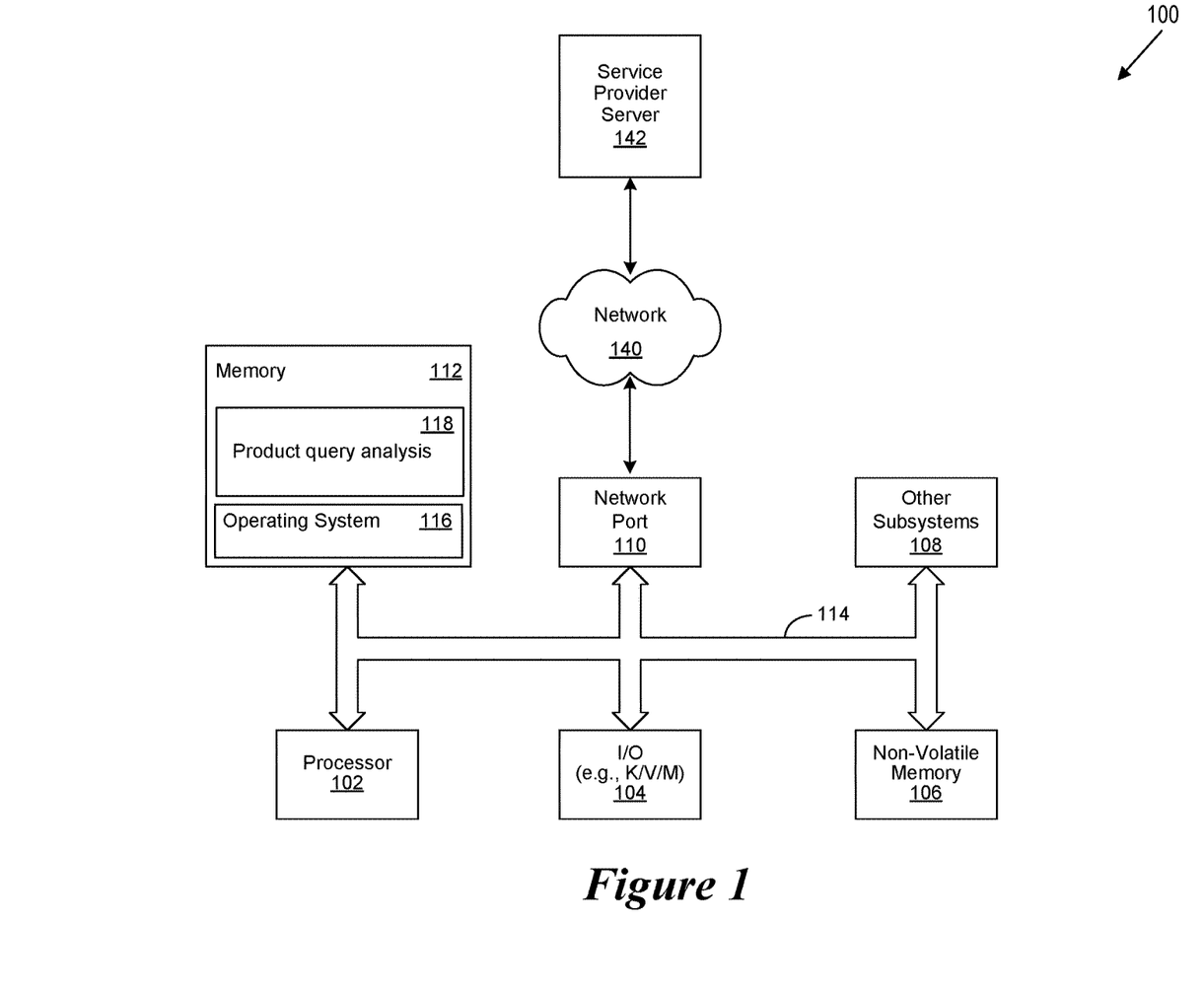
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a product query analysis system 118.

The product query analysis system 118 performs a product query analysis operation. The product query analysis operation improves processor efficiency (and thus the efficiency of the information handling system 100) by facilitating interpretation of product queries. As will be appreciated, once the information handling system 100 is configured to perform the product query analysis operation, the information handling system 100 becomes a specialized computing device specifically configured to perform the website customization operation and is not a general purpose computing device. Moreover, the implementation of the product query analysis operation on the information handling system 100 improves the functionality of the information handling system and provides a useful and concrete result of automatically interpreting product queries.

In certain embodiments, the product query analysis operation is performed via an artificial intelligence based engine. In certain embodiments, the product query analysis operation receives a natural language product query, comprehends product requirements from the query, interprets the requirements of the query, extracts product component details for the interpreted requirement, uses a scoring operation to search a product repository (such as a database) and produces a result which identifies suitable products relating to the product query. In certain embodiments, the identification is via a list of suitable products. In certain embodiments, the list of suitable products is sorted by suitability of a product to the query. In certain embodiments, the product query analysis operation occurs in real time (i.e., with no noticeable lag between receiving the query and producing the result.

More specifically, in certain embodiments, the product query analysis operation identifies clusters of keywords created from chat and other customer interaction data. In certain embodiments, the product analysis operation applies a neural network model to the query or other customer interaction data. In certain embodiments the neural network model generates a vector space representation of words within the query or customer interaction data. In certain embodiments, the neural network model includes a word2vec model. In certain embodiment, the word2vec model includes an artificial neural network model which generates vector space representation of words. Words which are used in the same context are associated with the same cluster and are located close together in the vector space. Accordingly, using such a neural network model clusters words used in similar context using a vector space representation. In certain embodiments, the neural network model includes applying a doc2vec model on columns of a product database to create document vector representation of product specifications.

Figure 2:
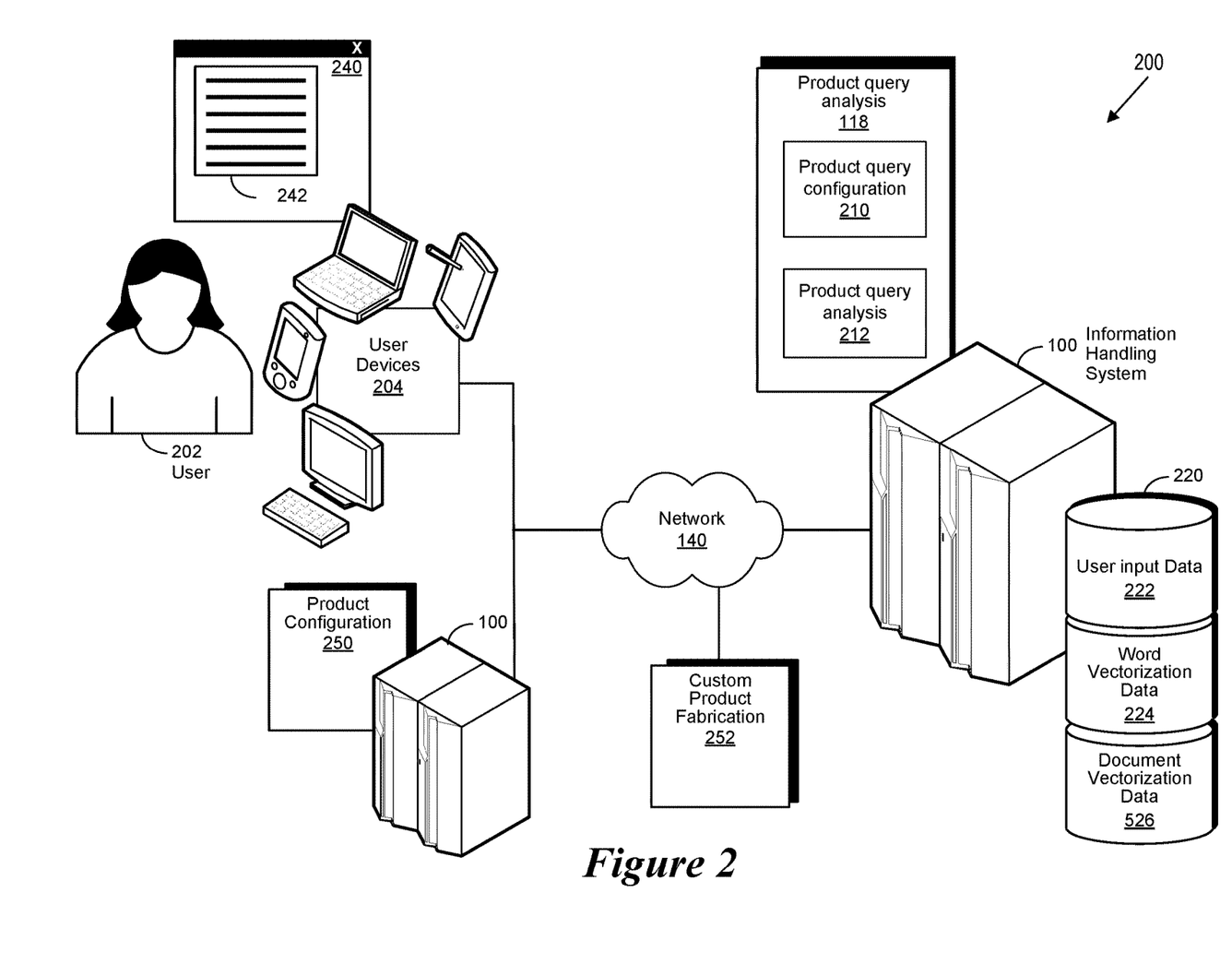
FIG. 2 shows a block diagram of a product query analysis environment.

FIG. 2 is a block diagram of a product query analysis environment 200 implemented in accordance with an embodiment of the invention. The product query analysis environment includes a product query analysis system 118 as well as a product query configuration system 210

In various embodiments, a user 202 generates a user query which is analyzed via the product query analysis system 118. In various embodiments, a product query analysis system 118 executes on a hardware processor of an information handling system 100. In these and other embodiments, the user 202 may use a user device 204 to interact with the product query analysis system 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device is configured to present a product query analysis user interface 240. In various embodiments, the product query analysis user interface 240 presents a ranked list of products 242 automatically generated in response to a user query. In various embodiments, the user device 204 is used to exchange information between the user 202 and the product query analysis system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the product query analysis system 118 includes a product query configuration module 210 which performs a product query configuration operation. In various embodiments, the product query analysis system 118 includes a product query analysis module 212 which performs a product query analysis operation. In various embodiments, the product query analysis environment includes a storage repository 220. The storage repository may be local to the system executing the product query analysis system 118 or may be executed remotely. In various embodiments, the storage repository includes one or more of a user input data repository 222, a word vectorization data repository 224 and a document vectorization data repository 226.

In various embodiments, the product query analysis system 118 interacts with a product configuration system 250 which may be executing on a separate information handling system 100. In various embodiments, the product configuration system 250 interacts with a custom product fabrication system 252. In various embodiments, the custom product fabrication system 252 fabricates products to include components identified using the product query analysis system 118. In various embodiments, the product query analysis user interface 240 may be presented via a website. In various embodiments, the website is provided by one or more of the product query analysis system 118 and the product configuration system 250.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Figure 3:
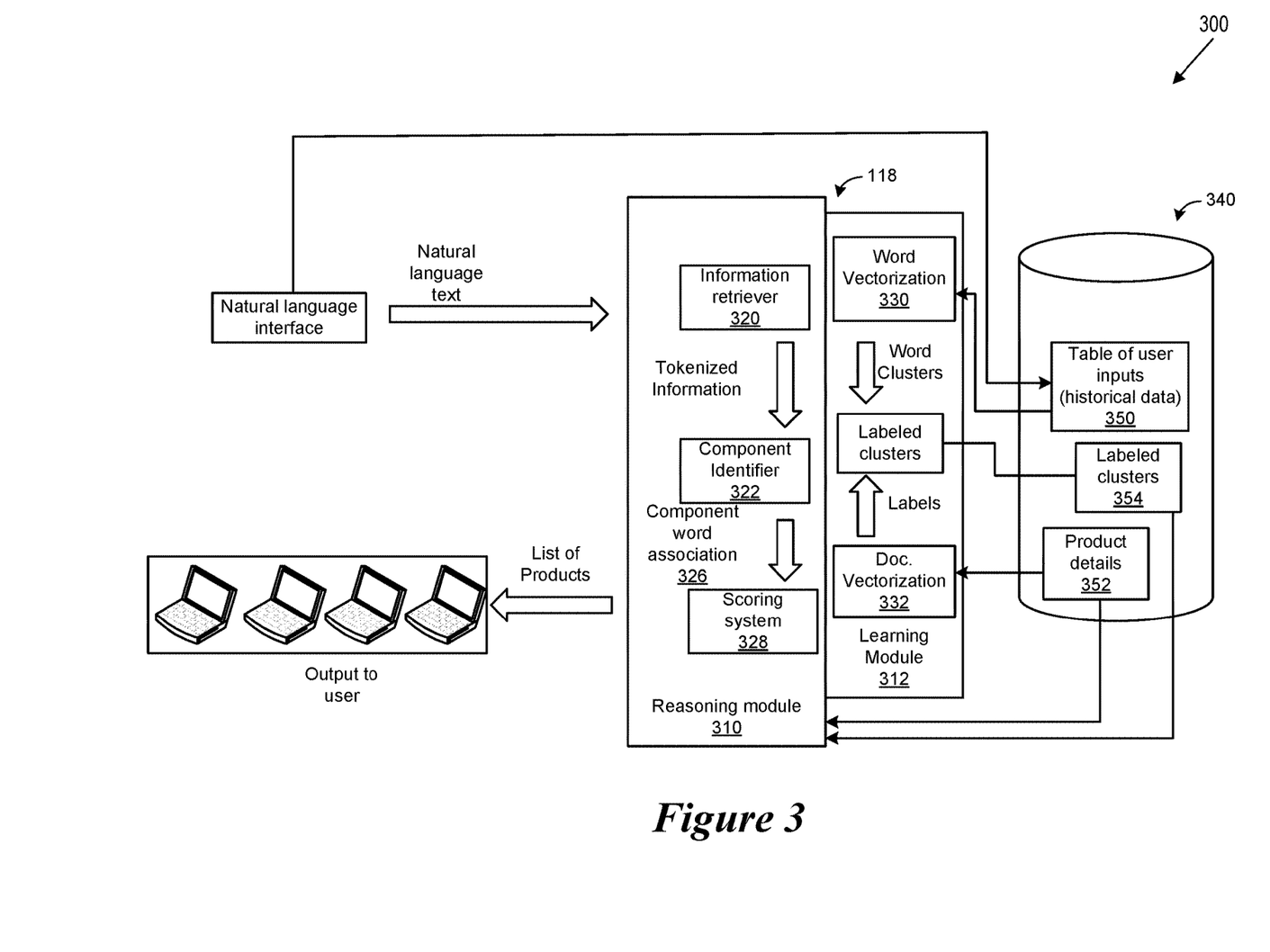
FIG. 3 shows a functional block diagram of a product query analysis environment.

Referring to FIG. 3, a functional block diagram of a product query analysis environment 300 is shown. The product query analysis environment 300 includes a product query analysis system 118. In various embodiments, the product query analysis system 118 includes a reasoning module 310 and a learning module 312. In various embodiments the reasoning module 310 performs the product query analysis operation. In various embodiments the learning module 312 performs the product query analysis configuration operation.

In various embodiments, the reasoning module 310 includes an information retriever portion 320, a component identifier portion 322, a component-word association portion 324 and a scoring system 328. In various embodiments, the learning module includes a word vectorization portion 330 which vectorizes historical data to provide word clusters and a document vectorization portion 332 which vectorizes product details to provide labels.

The product query analysis environment includes one or more data repositories 340. In various embodiments, the data repositories include a user input data repository 350, a product detail data repository 352 and a cluster repository 354. In certain embodiments, the product detail data repository 352 can include or be associated with a backend product repository such as a backend product database.

In operation, the product query analysis environment 300 receives a user query via a natural language interface. The natural language interface provides natural language text to the product query analysis system 118. The product query analysis system 118 provides a list of products as an output to the user.

Figure 4:
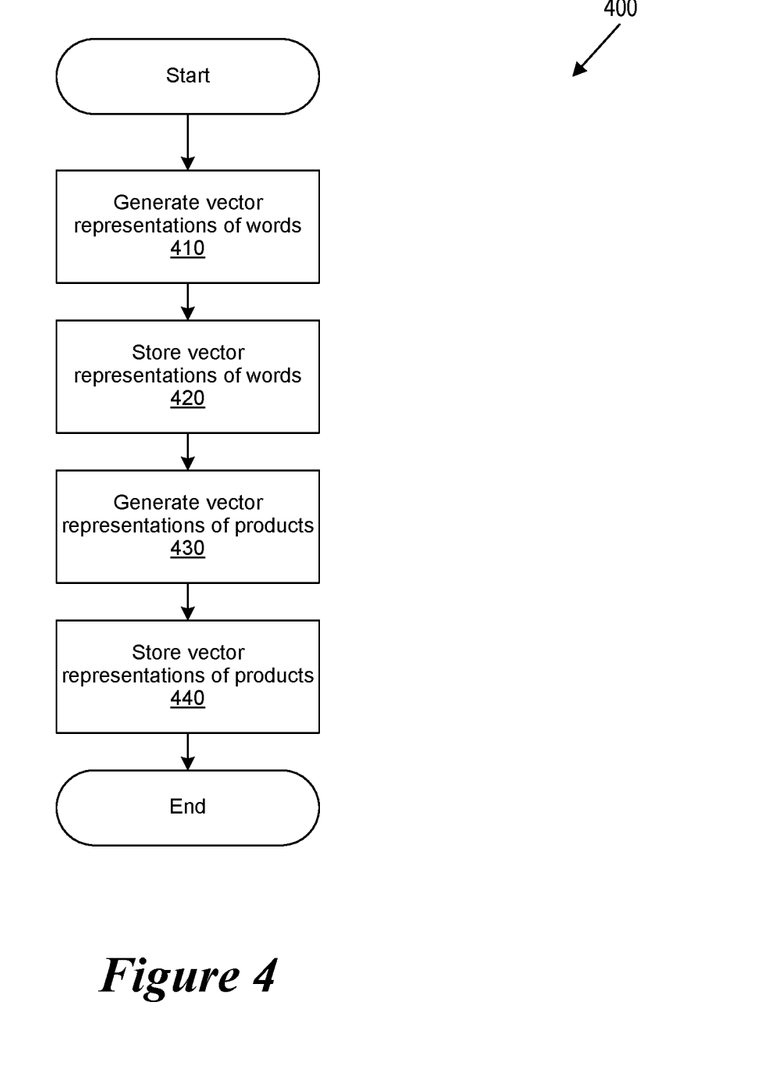
FIG. 4 shows a flow chart of a product query analysis configuration operation.
Figure 5A:
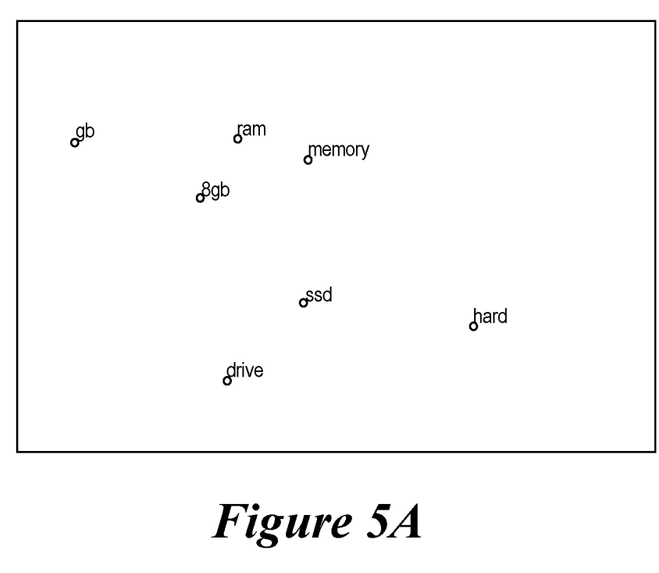
FIGS. 5A and 5B, generally referred to as FIG. 5, show example vector representations of word clusters within a word vector space.
Figure 5B:
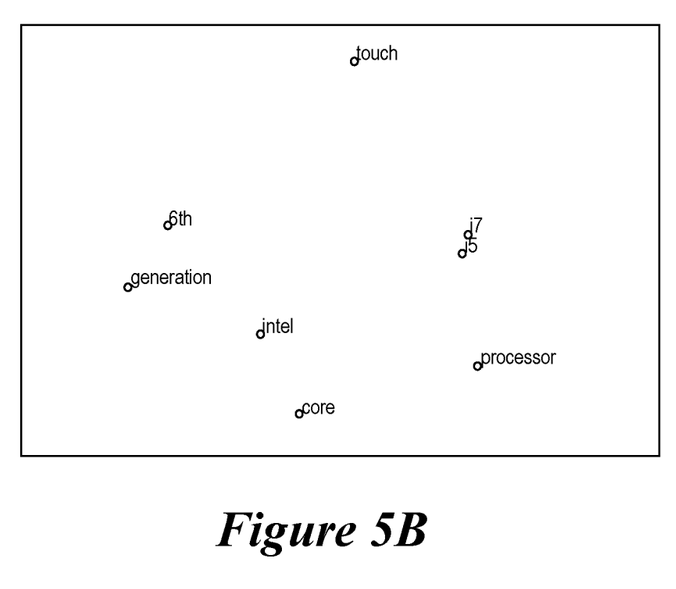

Referring to FIG. 4, a flow chart of a product query analysis configuration operation 400 is shown. When performing a product query analysis configuration operation, the product query analysis configuration module 210 generates a set of vector representations of words that are associated with a particular query type at step 410. For example, if the query type is relating to information handling systems, the words relate to various components and/or features relating to information handling system configurations. In the example shown in FIGS. 5A and 5B, show example representations of words clusters within a word vector space. For example, FIG. 5A shows that the words ram, memory and 8 GB occur close together in the vector space. FIG. 5B shows that processor related keywords are closely located in a vector space. In certain embodiments, distances between words in the vector space are represented by measuring a cosine distance between their vector space representations.

The product query analysis configuration module 210 then stores the set of vector representations within a word vector representation repository at step 420. The word vector representation repository includes vector representations of various words that are associated with a particular query type.

Next, at step 430, the product query analysis configuration module 210 generates a vector representation of the products available from a company such as a supplier or manufacturer. In certain embodiments, the product query analysis configuration operation performs a vectorization operation on each product contained within a product repository of the company. In certain embodiments, the vectorization operation includes execution of a document vectorization operation. In certain embodiments, the document vectorization operation includes execution of a doc2vec vectorization model. For the purposes of this disclosure, the doc2vec vectorization model learns to correlate labels and words rather than words with other words as with the word2vec vectorization model). The doc2vec vectorization model produces vectors that represent a meaning of a document, when can then be sued as input to an unsupervised machine learning algorithm to associate documents with labels. The product query analysis configuration module 210 then stores the vectorization models within a document vector representation repository at step 440.

Figure 6:
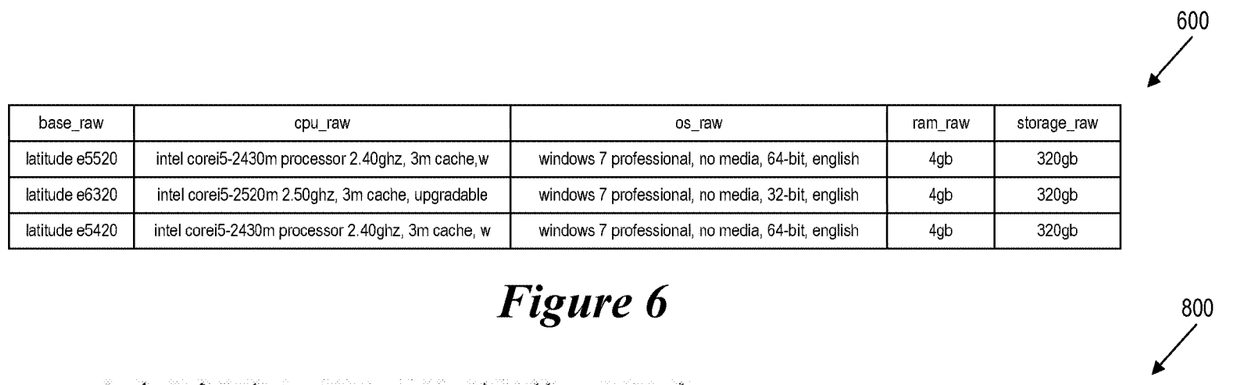
FIG. 6 show an example of a plurality of entries of a product repository

In certain embodiments, the document vectorization operation is performed against a product repository of the company. In certain embodiments, the product repository includes rows representing individual products where each row includes corresponding columns representing details related to the products. FIG. 6 shows an example of a plurality of entries 600 of the repository where the rows each have a specific information handling product and the columns include details about the respective product. More specifically, the columns include a column regarding a base system identification, a column providing details of a processor corresponding to the base system, a column providing details of an operating system corresponding to the base system, a column providing details of the random access memory associated with the base system and a column providing details of the storage capacity (e.g., non-volatile storage such as a disk drive or solid state drive) associated with the base system. The product query analysis configuration operation separately executes a document vectorization operation on each column of the product repository to provide respective vector models. Thus for the example shown in FIG. 6 the product query analysis configuration operation produces a base_raw vectorization model, a cpu_raw vectorization model and so on.

Figure 7A:
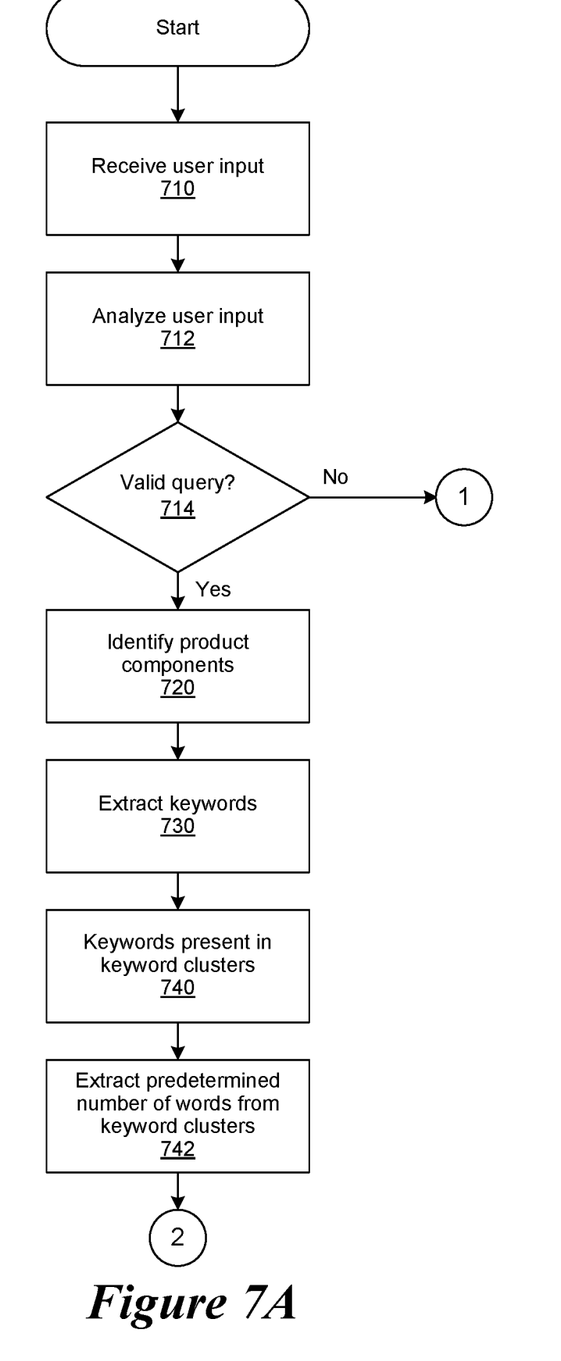
FIGS. 7A and 7B, generally referred to as FIG. 7, show a flow chart of a product query analysis operation.
Figure 7B:
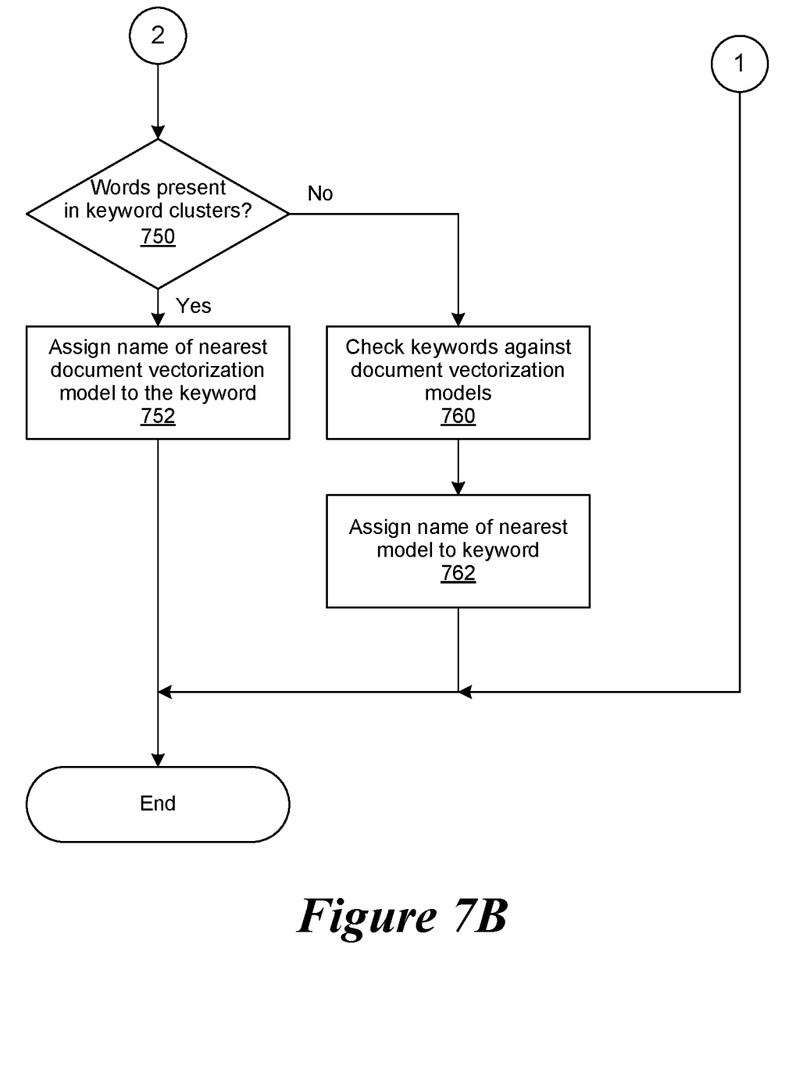

Referring to FIG. 7, a flow chart of a product query analysis operation is shown. The product query analysis operation starts at step 710 when the product query analysis system 118 receives a user input.

Next, the product query analysis operation analyzes the user input to determine whether the user input is a product query at step 712. In certain embodiments, the product query analysis system 118 uses past queries as training data to use when making the determination. In certain embodiments, the product query analysis system 118 executes a machine learning operation on the training data. In certain embodiments, the machine learning operation includes a support vector machine (SVM). Next, at step 714, the product query analysis operation classifies the user input as either a valid query or a non-valid input.

An example of a valid query might be a user input which sets forth "can you suggest me a computer which includes 8 gigabyte of RAM and a $6^{th}$ generation Intel processor?" It will be appreciated that the user input may be via a direct interaction between a customer and a provider such as an in person query or via a telephone call. In this case, some form of speech to text conversion may be performed. Alternately, the user input may be via a text input such as via a chat room interaction or a search of an online store. An example of a non-valid input might be "I am looking for repairing my latitude laptop which has a broken touch screen."

Next, at step 720 for a user input that is identified as a valid query, the product query analysis operation identifies product component references within the query. In certain embodiments, the query analysis operation uses the keyword clusters from the word vectorization repository and document clusters from the document vectorization repository to identify relevant components from a user query. More specifically at step 730, the product query analysis operation extracts keywords from the query. Next, at step 740 the product query analysis operation determines whether the keywords from the product query are present in the keyword clusters. If so, then at step 742 the product query analysis operation extracts a predetermined number of words (e.g., ten words) from the keyword clusters using a similarity metric (e.g., a cosine similarity metric or other similarity metric) which identifies words nearest to the query word within the word vector repository. In certain embodiments, the similarity metric is based upon a "most similar" property value available using a similarity operation available with a word2vec. model.

Next, at step 750 the product query analysis operation determines which of the document vectorization model is closest to the query keyword or any word from its list of closest keywords extracted in step 742. In certain embodiments, the determination is made using a word-document similarity operation (e.g., a cosine similarity metric or any other similarity metric). If any of the keywords are present in the word vectorization model repository then the product query analysis operation labels the keyword with a name of the nearest document vectorization model at step 752. If the keywords are not present in any word vectorization model clusters, then the product query analysis operation checks the keywords against the document vectorization models using a word-document similarity operation (e.g., a cosine similarity metric or other similarity metric) at step 760. The product query analysis operation then assigns the name of the nearest document vectorization model to the keyword at step 762.

For example, when analyzing a query which includes a reference to a particular product line (such as a query that includes the word 'latitude'), the closest documents that are identified by the product query analysis operation will be closest to documents in the base product (base_product) vectorization model rather than in the operating system (os) vectorization model. Thus, the keyword is associated with the base product category.

Also for example certain queries might include functionally descriptive keywords such as "email," "spreadsheets," "applications," etc. These types of keywords are related to product usage and would be associated with product usage clusters. For such product usage clusters, the product query analysis operation first identifies a closest product related word from word vectorization model and then compares the closest product related word with the document vectorization model.

For example, for a keyword which is associated with a word vectorization cluster containing the word "gaming," the closest word to "gaming" would be a product line specializing in gaming. The keyword might specifically be the word "gaming," or the keyword could be a word referencing a particular game or type of game. In certain embodiments, the product line specializing in gaming might be the Alienware product line available from Dell Technologies. In certain embodiments, the closest word is determined using a cosine similarity operation such as the word2vec cosine similarity operation. In certain embodiments, the product line becomes associated with a base product vectorization model and the keyword is associated with the base product category.

Consider the following sample user query: "I am looking for a desktop with 16 GB ram and Linux operating system." The product query analysis operation first removes non important keywords (also referred to as stop words) such as "I," "with" etc. Next, for each remaining word in the user query, the product query analysis operation identifies a closest word vectorization cluster from the word vectorization model cluster repository using a similarity score. Next, the product query analysis operation identifies a label of that cluster using the document vectorization model and assigns the label to the keyword. For the case the word vectorization model cluster does not contain the word, the product query analysis operation searches the document vectorization model repository for any models associated with the keyword.

For the sample user query, the product query analysis operation identifies a plurality of components including a base system component (desktop) a memory component (16 gb ram) and an operating system component (Linux). The product query analysis operation then accesses the document vectorization model repository to identify most relevant products from a backend product database using a scoring operation. In certain embodiments, the scoring operation uses a combination score of simple keyword match score (also known as component match score) and a semantic score. In certain embodiments, the combination score includes a score of 1 or 0 based on whether the keyword is present in product description in the backend product database or not) and a semantic score (e.g., using cosine similarity or any other similarity metric between vector representation of words).

While simple keyword search might lead to satisfactory results in some cases, using only this score is insufficient for queries containing vague keywords (such as desktop) instead of a particular product category. Simple keyword search also might be insufficient for functionally descriptive keywords which might not be directly stored within a backend product database. Also the semantic similarity between words score is useful to sort the results according to relevance to the user query. Accordingly, in certain embodiments, the total score=component_match_score+semantic score.

Figure 8:
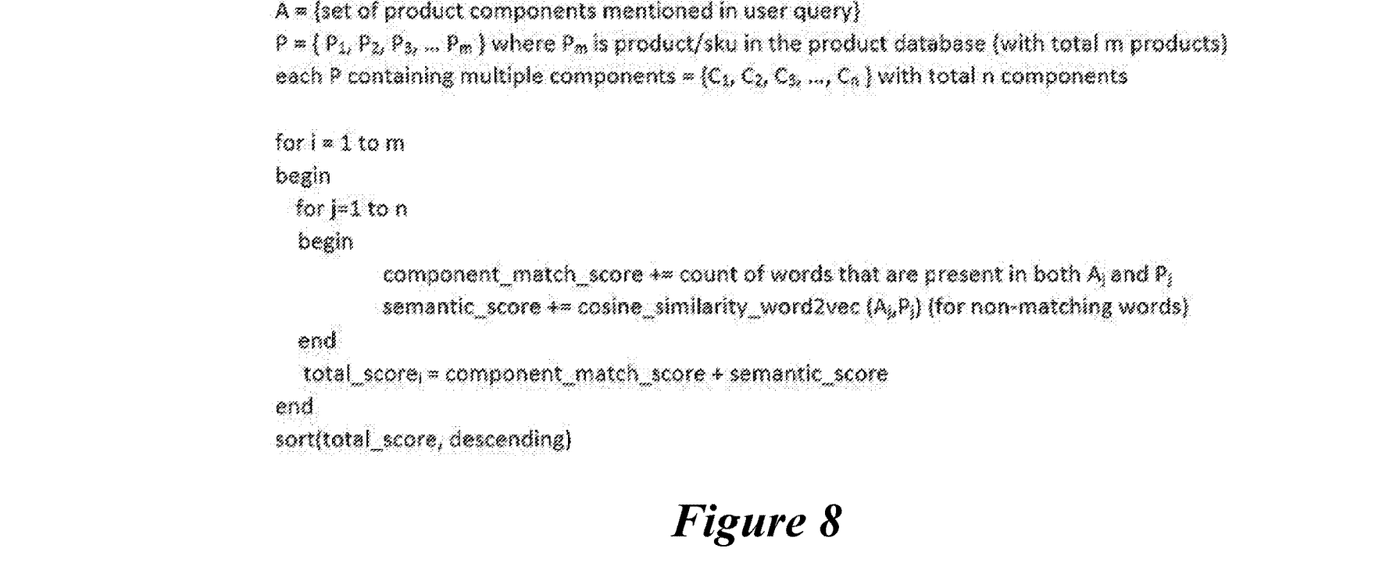
FIG. 8 shows a pseudo code representation of a scoring operation.

Referring to FIG. 8, a pseudo code representation 800 of a scoring operation which is performed by a scoring engine is shown. In certain embodiments, the scoring operation repeated for each identified keyword. In certain embodiments, the scoring operation provides a list of the top scores (e.g., x scores, which may be set to any number) from the total scores. In certain embodiments, the products associated with the top scores are presented to the user as a response to the user query. In certain embodiments, the environment manufactures a device corresponding to a product selected by the user from the list of products associated with the top scores.

In certain embodiments, the query analysis operation also analyzes words of degree such as at least, more than, less than, etc. For words of degree, the query analysis operation performs a logical check before displaying the results. The query analysis operation assures that any presented products have a capacity that is larger than a value described via "at least." For example, if a query contained an at least capacity describing a hard drive component size, then the query analysis operation only presents those results which have the hard drive component greater than value mentioned in user query.

Consider the following sample user query: "hello I am looking for a laptop with 2.3 ghz Intel processor and linux operating system." The query analysis operation identifies and extracts product components from the query. More specifically, for the sample user query the product components identified and extracted by the query analysis operation include a base component (laptop), a processor component (2.3ghz Intel processor) and an operating system component (linux).

Continuing the example, for a sample backend product database containing three products, the scoring operation is performed for each product in the backend product database.

More specifically, the backend product database contains an entry for a first product (Product 1) having the following configuration: base component: latitude e5420; processor component: intel core i3-2350m processor 2.3 ghz; operating system component: linux; and, storage component: 320 gb.

When performing the scoring operation on the first product, the query analysis operation produces a total score of 5.272. This score is produced as follows. An exact match score is generated as 4 which can be decomposed as a score of 3 for the processor match and a score of 1 for the operating system match. A semantic match score of 0.661 is generated by using a similarity metric (e.g., a cosine similarity metric or any other similarity metrics) to identify the similarity between the keyword "laptop" and the product identifier "latitude" contained with the word vectorization model. A semantic match score of 0.611 is generated by using a cosine similarity metric to identify the similarity between the keyword "laptop" and the product identifier "e5420" contained with the word vectorization model. Thus the total score of 5.272 equals 4+0.661+0.611.

Continuing the example, the backend product database also contains an entry for a second product (Product 2) having the following configuration: base component: inspiron n4020; processor component: intel dual core t4500 processor 2.3 ghz; operating system component: Windows 7; and, storage component: 320 gb. When performing the scoring operation on the second product, the query analysis operation produces a total score of 4.688. This score is produced as follows. An exact match score is generated as 3 which can be decomposed as a score of 3 for the processor match. A semantic match score of 0.668 is generated by using a cosine similarity metric to identify the similarity between the keyword "laptop" and the product identifier "inspiron" contained with the word vectorization model. A semantic match score of 0.501 is generated by using a cosine similarity metric to identify the similarity between the keyword "laptop" and the product identifier "n4020" contained with the word vectorization model. A semantic match score of 0.519 is generated by using a cosine similarity metric to identify the similarity between the keyword "windows" and the product identifier "linux" contained with the word vectorization model. Thus the total score of 4.688 equals 3+0.668+0.501+0.519.

Continuing the example, the backend product database also contains an entry for a third product (Product 3) having the following configuration: base component: Optiplex 7010n; processor component: intel Pentium processor dual core 2.3 ghz; operating system component: linux; and, storage component: 500 gb. When performing the scoring operation on the third product, the query analysis operation produces a total score of 4.227. This score is produced as follows. An exact match score is generated as 4 which can be decomposed as a score of 3 for the processor match and a score of 1 for the operating system match. A semantic match score of 0.117 is generated by using a cosine similarity metric to identify the similarity between the keyword "laptop" and the product identifier "OptiPlex" contained with the word vectorization model. A semantic match score of 0.110 is generated by using a cosine similarity metric to identify the similarity between the keyword "laptop" and the product identifier "7010n" contained with the word vectorization model. Thus the total score of 4.227 equals 4+0.117+0.110.

Continuing the example, Product 1 has the highest score and can be suggested as the best option for the user query. The word "laptop" (Product 1) is semantically closer to "latitude" than compared to "OptiPlex" (Product 3) hence product 1 is the most relevant result. In case of product 2 even though it is "laptop" the os is "windows" and not "linux" which results in lower score. In certain embodiments, the scoring operation includes a condition on assigning greater importance to base match scores in case two systems have the same scores. The same operation is used with different components of the system as well as with different prices.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Python, Java, Smalltalk, C++ or the like. However, the computer program code for carrying out operations of the present invention may also be written in conventional procedural programming languages, such as the "C" programming language or 'R' and similar programming languages. The operations of the present invention can also be implemented using software packages such as SAS, IBM Watson or software packages which support Machine Learning algorithms. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a product query operation, comprising:
   receiving user input from a user, the user input comprising chat customer interaction data, the chat interaction data being received via a chat agent;
   identifying keywords contained within the user input;
   comparing keywords to vector representations of words and document vector representation of product specifications from a backend product repository, each vector representation of a word being associated with a particular query type, the backend product repository comprising a plurality of entries, each of the plurality of entries comprising information regarding a specific information handling system product, the specific information handling system having a specific set of components;
   identifying component details based upon the comparing;
   providing a list of products corresponding to the component details to the user, the list of products comprising a list of information handling system products, each of the information handling system products having an associated set of components;
   performing a document vectorization operation on columns of the backend product repository, the document vectorization operation generating the document vector representation of product specifications;
   performing a scoring operation on identified component details, the scoring operation using a combination of a simple keyword match score and a semantic score, the semantic score being based upon the document vectorization operation;

ranking the list of products based upon the scoring operation;
performing a natural language analysis of the user input; and,
determining whether the user input comprises a valid user query; and wherein
the scoring operation determines suitability of a product to the valid user query; and,
the ranking sorts the list of products by suitability of a product to the valid user query;
and wherein the scoring operation and ranking are performed as follows:
A={set of product components mentioned in user query}
P={$P_1, P_2, P_3 \ldots P_m$} where $P_m$ is product/sku in the backend product repository (with total m products)
each P containing multiple components={$C_1, C_2, C_3 \ldots, C_n$} with total n components
for i=1 to m
begin for i=1 to n begin component match score+=count of words that are present in both $A_i$ and $P_i$ semantic score+=cosine similarity word2vec ($A_i, P_i$) (for non-matching words) end total score$_i$ =component match score+semantic score
end
sort(total score, descending).

2. The method of claim 1, wherein:
the columns of the backend product repository include a column regarding a base system identification, a column providing details of a processor corresponding to the base system, a column providing details of an operating system corresponding to the base system, a column providing details of random access memory associated with the base system and a column providing details of storage capacity associated with the base system; and,
the document vector representation of product specifications is based upon content of all of the columns of the backend product repository.

3. The method of claim 1, further comprising:
generating clusters of keywords within the vector representations of words; and
wherein
the identifying identifies a cluster of keywords from the clusters of keywords, the cluster of keywords corresponding to the particular query type.

4. The method of claim 3, wherein:
the clusters of keywords are generated using a neural network model, the neural network model comprising a word2vec model.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving user input from a user, the user input comprising chat customer interaction data, the chat interaction data being received via a chat agent;
identifying keywords contained within the user input;
comparing keywords to vector representations of words and document vector representation of product specifications from a backend product repository, each vector representation of a word being associated with a particular query type, the backend product repository comprising a plurality of entries, each of the plurality of entries comprising information regarding a specific information handling system product, the specific information handling system having a specific set of components;
identifying component details based upon the comparing;
providing a list of products corresponding to the component details to the user, the list of products comprising a list of information handling system products, each of the information handling system products having an associated set of components;
performing a document vectorization operation on columns of the backend product repository, the document vectorization operation generating the document vector representation of product specifications
performing a scoring operation on identified component details, the scoring operation using a combination of a simple keyword match score and a semantic score, the semantic score being based upon the document vectorization operation;
ranking the list of products based upon the scoring operation;
performing a natural language analysis of the user input; and,
determining whether the user input comprises a valid user query; and wherein
the scoring operation determines suitability of a product to the valid user query; and
the ranking sorts the list of products by suitability of a product to the valid user query; and wherein
the scoring operation and ranking are performed as follows:
A={set of product components mentioned in user query}
P={$P_1, P_2, P_3 \ldots P_m$} where $P_m$ is product/sku in the backend product repository (with total m products)
each P containing multiple components={$C_1, C_2, C_3 \ldots, C_n$} with total n components
for i=1 to m
begin for i=1 to n begin component match score+=count of words that are present in both $A_i$ and $P_i$ semantic score+=cosine similarity word2vec ($A_i, P_i$) (for non-matching words) end total score, =component match score+semantic score
end
sort(total score, descending).

6. The system of claim 5, wherein:
the columns of the backend product repository include a column regarding a base system identification, a column providing details of a processor corresponding to the base system, a column providing details of an operating system corresponding to the base system a column providing details of random access memory associated with the base system and a column providing details of storage capacity associated with the base system; and,
the document vector representation of product specifications is based upon content of all of the columns of the backend product repository.

7. The system of claim 5, wherein the instructions executable by the processor are further configured for:
generating clusters of keywords within the vector representations of words; and
wherein
the identifying identifies a cluster of keywords from the clusters of keywords, the cluster of keywords corresponding to the particular query type.

8. The system of claim 7, wherein:
the clusters of keywords are generated using a neural network model, the neural network model comprising a word2vec model.

9. A non-transitory, computer-readable storage medium embodying computer program code, the computer program code comprising computer executable instructions configured for:
receiving user input from a user, the user input comprising chat customer interaction data, the chat interaction data being received via a chat agent;
identifying keywords contained within the user input;
comparing keywords to vector representations of words and document vector representation of product specifications from a backend product repository, each vector representation of a word being associated with a particular query type, the backend product repository comprising a plurality of entries, each of the plurality of entries comprising information regarding a specific information handling system product, the specific information handling system having a specific set of components;
identifying component details based upon the comparing;
providing a list of products corresponding to the component details to the user, the list of products comprising a list of information handling system products, each of the information handling system products having an associated set of components; and,
performing a document vectorization operation on columns of the backend product repository, the document vectorization operation generating the document vector representation of product specifications
performing a scoring operation on identified component details, the scoring operation using a combination of a simple keyword match score and a semantic score, the semantic score being based upon the document vectorization operation;
ranking the list of products based upon the scoring operation;
performing a natural language analysis of the user input; and,
determining whether the user input comprises a valid user query; and wherein
the scoring operation determines suitability of a product to the valid user query; and,
the ranking sorts the list of products by suitability of a product to the valid user query;
and wherein
the scoring operation and ranking are performed as follows:

A={set of product components mentioned in user query}
P={$P_1$, $P_2$, $P_3$ ... $P_m$} where $P_m$ is product/sku in the backend product repository (with total m products)
each P containing multiple components={$C_1$, $C_2$, $C_3$ ... , $C_n$} with total n components
for i=1 to m
begin for i=1 to n begin component match score+=count of words that are present in both $A_i$ and $P_i$ semantic score+=cosine similarity word2vec ($A_i$,$P_i$) (for non-matching words) end total score, =component match score+semantic score
end
sort(total score, descending).

10. The non-transitory, computer-readable storage medium of claim 9, wherein:
the columns of the backend product repository include a column regarding a base system identification, a column providing details of a processor corresponding to the base system, a column providing details of an operating system corresponding to the base system a column providing details of random access memory associated with the base system and a column providing details of storage capacity associated with the base system; and,
the document vector representation of product specifications is based upon content of all of the columns of the backend product repository.

11. The non-transitory, computer-readable storage medium of claim 9, wherein the computer executable instructions are further configured for:
generating clusters of keywords within the vector representations of words; and
wherein
the identifying identifies a cluster of keywords from the clusters of keywords, the cluster of keywords corresponding to the particular query type.

12. The non-transitory, computer-readable storage medium of claim 11, wherein:
the clusters of keywords are generated using a neural network model, the neural network model comprising a word2vec model.

13. The non-transitory, computer-readable storage medium of claim 9, wherein:
the computer executable instructions are deployable to a client system from a server system at a remote location.

14. The non-transitory, computer-readable storage medium of claim 9, wherein:
the computer executable instructions are provided by a service provider to a user on an on-demand basis.

* * * * *